Figure 1:
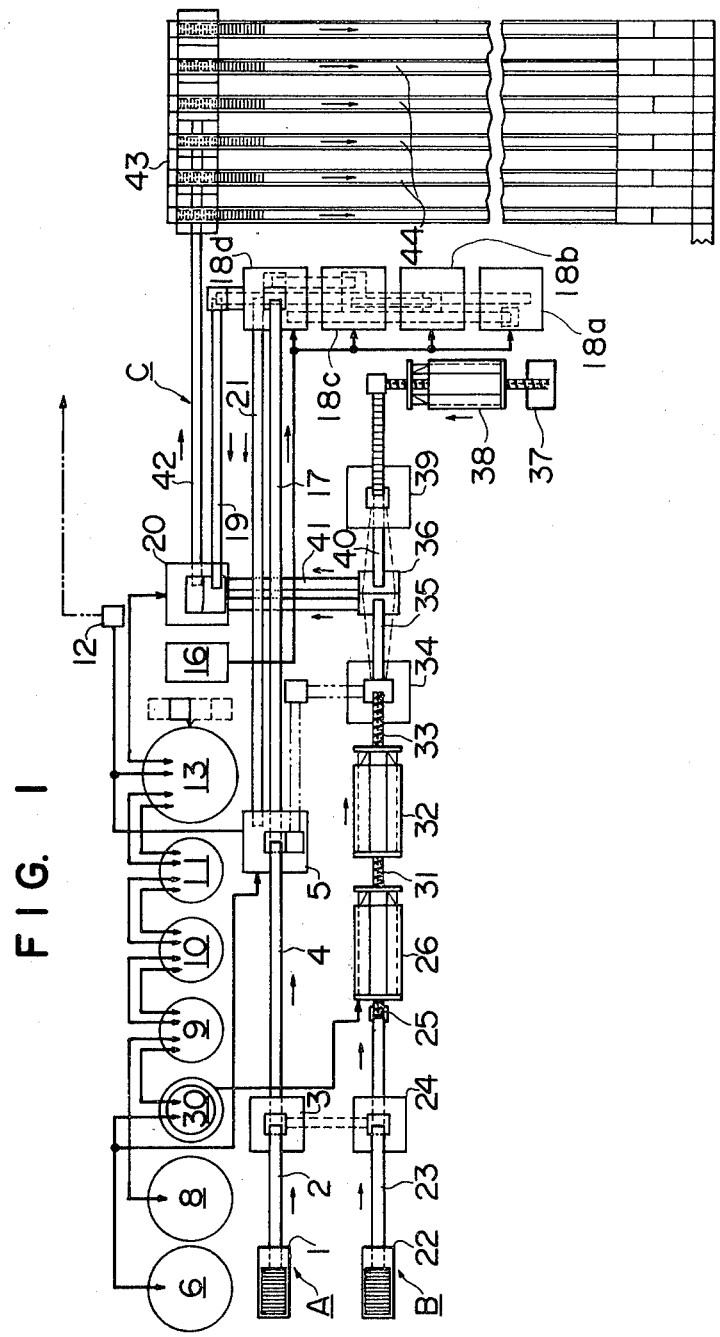

United States Patent [19]
Kimura

[11] 3,903,307

[45] Sept. 2, 1975

[54] PROCESS OF MAKING THE FEED STUFF CONTAINING BAGASSE, PROTEIN, AND YEAST

[76] Inventor: Yosiaki Kimura, 902, Aza-Ameku, Naha, Okinawa, Japan

[22] Filed: Aug. 23, 1972

[21] Appl. No.: 283,156

[52] U.S. Cl. ..................... 426/53; 195/33; 195/111
[51] Int. Cl.............................................. A23k 1/00
[58] Field of Search ............. 426/49, 52, 53; 195/7, 195/8, 9, 33, 111, 83

[56] References Cited
UNITED STATES PATENTS

| | | | |
|---|---|---|---|
| 2,440,546 | 4/1948 | Jeffreys............................ | 195/111 X |
| 3,314,797 | 4/1967 | Hess et al. ............................ | 426/53 |
| 3,627,095 | 12/1971 | Srinivasan et al..................... | 195/33 |
| 3,642,580 | 2/1972 | Ghose................................... | 195/33 |
| 3,764,475 | 10/1973 | Mandels et al.................... | 195/33 R |

OTHER PUBLICATIONS
Cook, The Chemistry and Biology of Yeasts, 1958, page 54.

*Primary Examiner*—Lionel M. Shapiro
*Attorney, Agent, or Firm*—Steinberg & Blake

[57] ABSTRACT

Disclosed is a process of making a feed stuff for cattles, pigs, or poultry by subjecting a mixture of bagasse, Candida utilis or a variety of yeast fungus, var major, and Trichoderma viride to a fermentation treatment, mixing a fermentation product with the crushed and dried top portion of sugar canes, having added thereto cereals, and rolling and drying a resultant mixture into a desired shape. Also disclosed is the invention of the apparatus suitable for conducting the above process.

10 Claims, 14 Drawing Figures

PROCESS OF MAKING THE FEED STUFF CONTAINING BAGASSE, PROTEIN, AND YEAST

DESCRIPTION OF THE INVENTION

The present invention relates to a process of making a feed containing bagasse, yeast, and protein for cattle, pigs, or poultry by mixing bagasse, i.e., crushed sugarcane refuse from sugar making, with a protein yeast fungus, Candida utilis or the parent yeast, C. utilis var major and cellulose decomposing bacteria, *Trichoderma viride*, by fermenting the mixture of the above materials at the optimum temperature of fermentation, by mixing, in a definite ratio, the fermented bagasse mixture and the top portion of a sugar cane which has been crushed, dried, and mixed with cereals, and then by rolling and drying the resultant mixture into an appropriate feeding shape.

There are many sugar producing countries and in a large majority of these countries, sugar is produced from sugar cane, which provides a large amount of bagasse. However, there have not yet been developed proper ways of utilizing bagasse and thus these countries are suffering from the disposal of the accumulated bagasse.

Also, Candida utilis can be used for a food and feed as a yeast fungus and in this invention an increase in the amount of fungus is achieved by using waste molasses, etc., as the cultivation medium. The inventor has noticed that because the fungus has a function of accumulating a protein having a high nutritional value in the body of yeast, the bagasse can be utilized as a feed containing a highly nutritious protein by using the above-mentioned fungus as a protein yeast fungus for a mixed feed mainly consisting of the bagasse. It has been also confirmed that the cultivation of the yeast can be accomplished in a quite short period of time different from other yeasts, the yeast is effective for mass production, i.e., the yeast can be increased to 12 times the amount of the seed yeast in six hours by cultivating the yeast in a neutralized liquid of waste molasses in an aerated method.

The composition of the protein yeast fungus, *Candida utilis*, is as follows:

| Components | Proportion (grams per 100 g. of the dried yeast fungus) | |
|---|---|---|
| Protein | 46.0 | g. |
| Lipid | 2.8 | g. |
| Carbohydrate | 37.7 | g. |
| Ash content | 5.5 | g. |
| Calcium | 50 | mg. |
| Phosphorus | 1100 | mg. |
| Iron | 80 | mg. |
| Vitamin A | 0 | |
| Vitamin $B_1$ | 2.5 | mg. |
| Vitamin $B_2$ | 2.6 | mg. |
| Nicotinic acid | 30 | mg. |
| Vitamin C | 0 | |

Furthermore, *Trichoderma viride* is a fungus for producing dextrose by the decomposition action of the cellulose and hemicellulose of crude fibers, plentifully contained in the bagasse or grasses for crude feeds.

It has also been discovered that by decreasing the proportion of the crude fibers in the bagasse by utilizing the yeast fungus, the nutritional value as the feed stuff is increased, the feed becomes digestable, and the bagasse containing a large proportion of crude fibers can be utilized as a mixed feed.

Based on the aforesaid discoveries, the inventor has succeeded in, as the results of extensive studies, attaining an economical process of producing a complete feed stuff for domestic animals by mixing bagasse with fungi such as *Candida utilis* or C. utilis var major, which is the parent yeast of *Candida utilis* and *Trichoderma viride*, and by fermenting the mixture in a multiple-tank type fermentator to increase the nutritional value of the bagasse feed and the digestability of the feed and the proportion of protein in the feed, and by adjusting properly the proportion of the crude fibers necessary for a ruminant, and, further, by adding to the fermented mixture a starch source suitable for ox, pig, etc.

Moreover, as a plant for suitably conducting the above process of this invention, the inventor has also succeeded in inventing the improved apparatus comprising (A) a bagasse treating means of fermenting the raw material bagasse to provide the bagasse containing a protein suitable for animal feed; (B) a green stalk treating means of cutting, drying and crushing the top portion of a sugar cane (hereinafter, the portion, grasses and other greens are called "green stalk") and adding thereto cereals; and (C) a means of mixing the bagasse from the bagasse treating means (A) and the treated green stalk from the means (B), of rolling the mixture into a sheet having a definite width and thickness followed by drying and cutting to an appropriate length.

Figure 2:
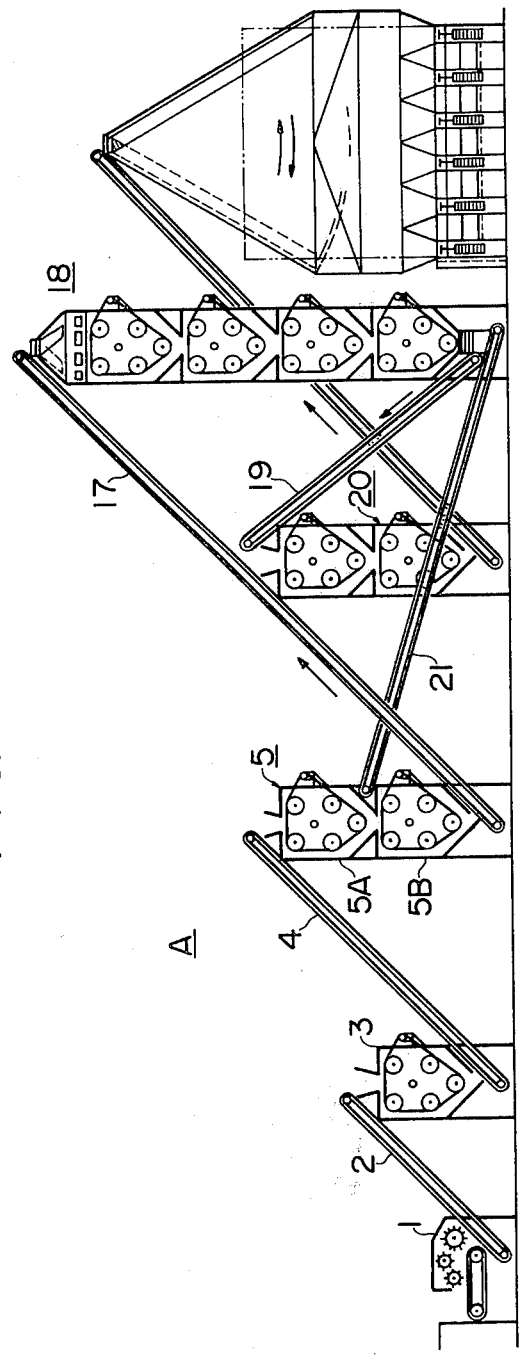
Figure 3:
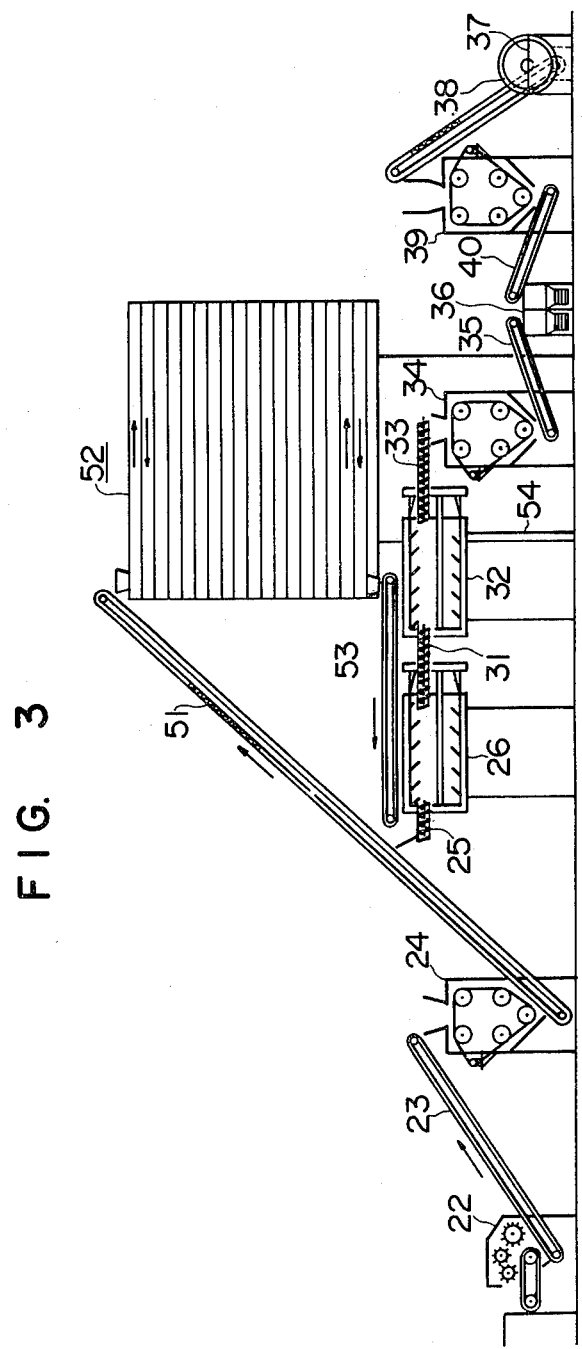
Figure 4:
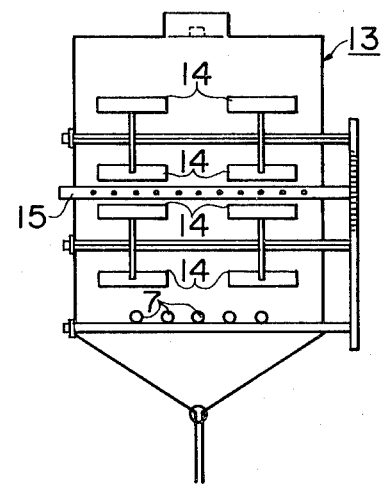
Figure 5:
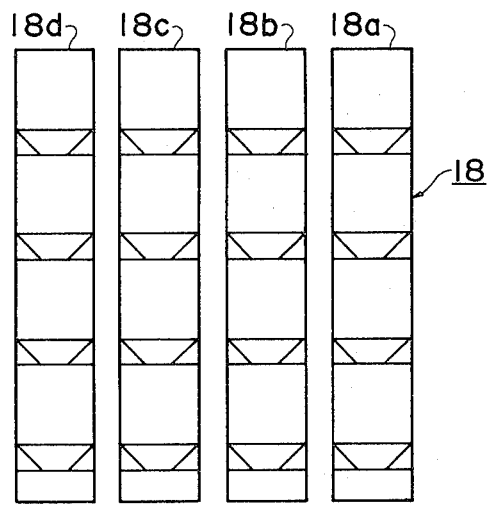
Figure 6:
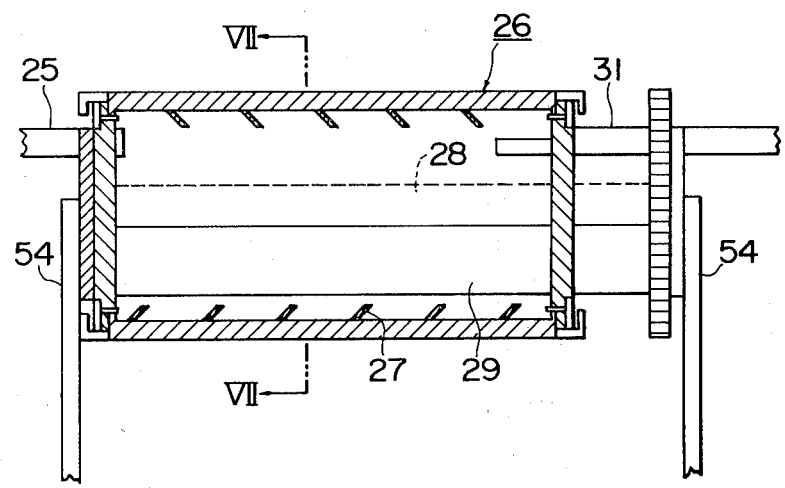
Figure 7:
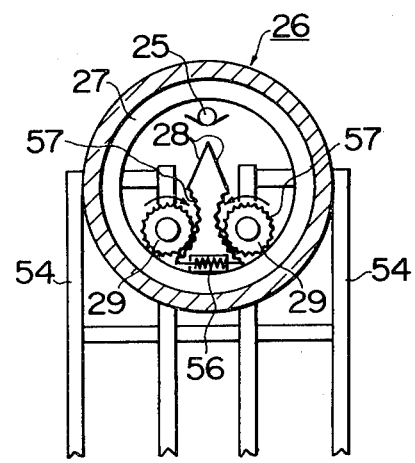
Figure 8:
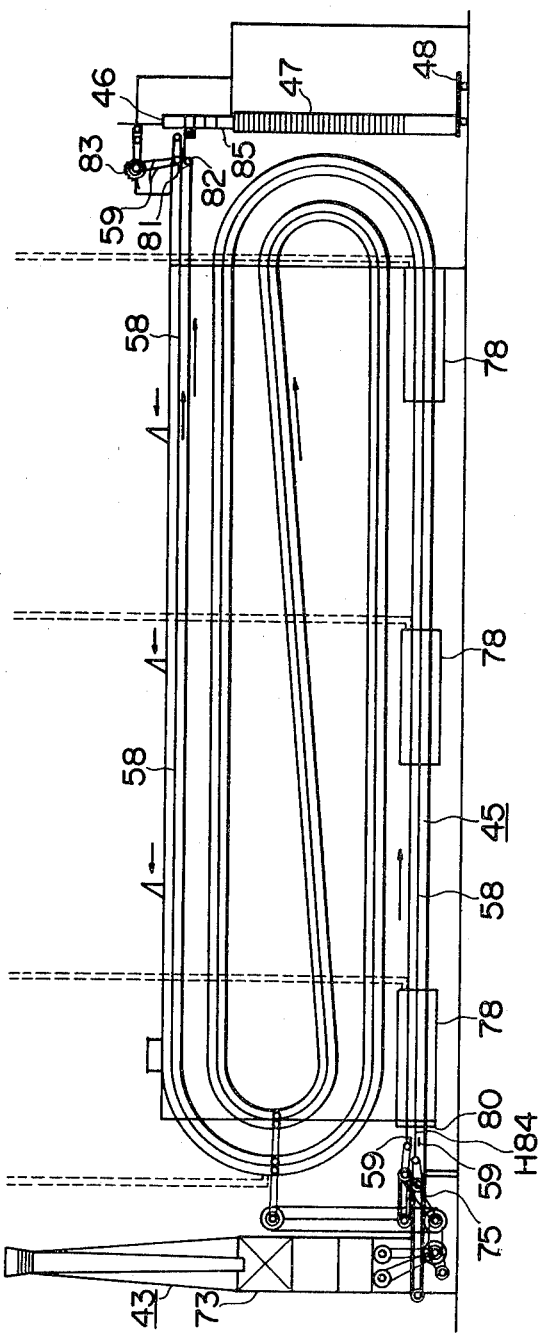
Figure 9:
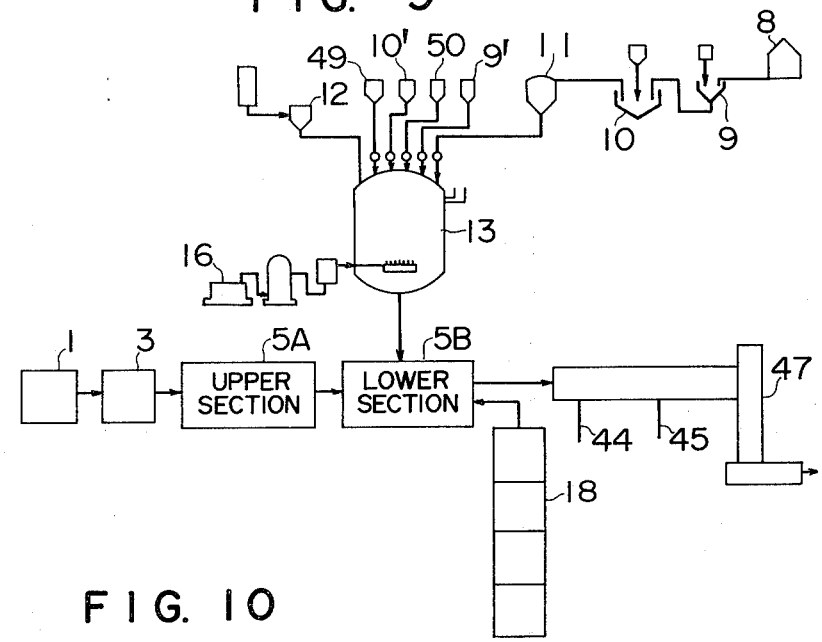
Figure 10:
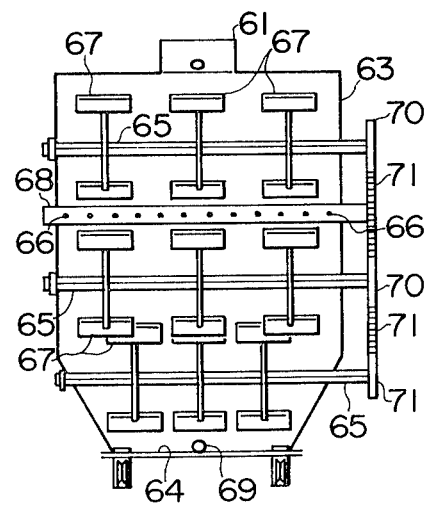
Figure 11:
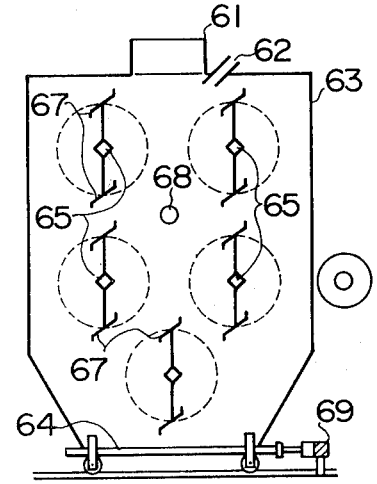
Figure 12:
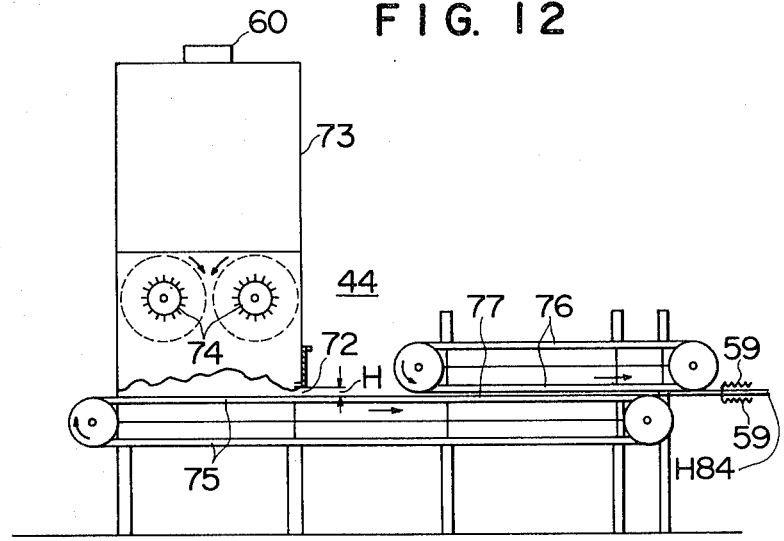
Figure 13:
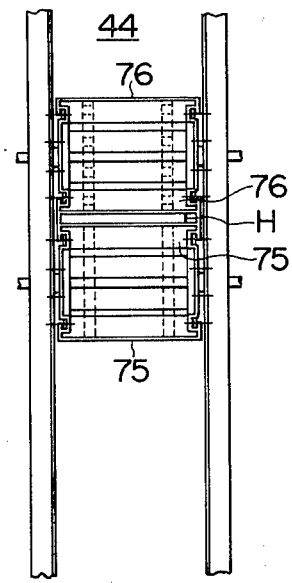
Figure 14:
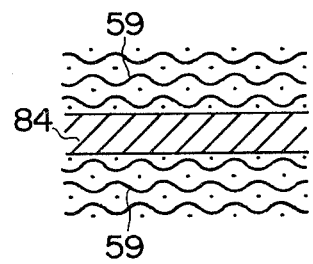

Now, the invention will be explained in detail referring to the accompanying drawings, in which FIG. 1 is a front view showing an embodiment of the whole apparatus of this invention for producing feed stuff containing bagasse and yeast proteins, FIG. 2 is a front view showing an embodiment of the bagasse treating means of this invention, FIG. 3 is a front view showing an embodiment of the green stalk treating means of this invention, FIG. 4 is a sectional front view showing the fermentation and agitation means used in this invention, FIG. 5 is a schematic view illustrating time intervals for withdrawing fermented products from the fermentation means, FIG. 6 is sectional front view showing the hot blast crushing means used in this invention, FIG. 7 is a sectional side view taken along the line 7—7 of the means of FIG. 6, FIG. 8 is a front view showing a means of conducting the rolling, drying, cutting, and storage of the fermented mixture, FIG. 9 is a flow sheet illustrating the process of this invention, FIG. 10 is a sectional front view showing another embodiment of the fermentation and agitation means used in this invention, FIG. 11 is a sectional side view of the fermentation and agitation means of FIG. 10, FIG. 12 is the enlarged front view of the rolling means of the apparatus shown in FIG. 8, FIG. 13 is a front view of the rolling means of FIG. 12 with its parts separated, and FIG. 14 is an enlarged sectional side view showing the wire netting member used in the rolling, fermenting, and mixing means of FIG. 8.

Now, the apparatus of this invention is composed of the bagasse treating system (A) of fermenting a raw material bagasse to provide the bagasse containing a protein and crude fibers suitable for animal feed; the green stalk treating system (B) of finely cutting a green stalk, i.e., the top portion of a sugar cane, drying the cut green stalk by a hot blast, and adding cereals to the dried green stalk; and a packing system (C) of mixing in a definite weight ratio of the bagasse from the system (A) to the green stalk from the system (B), of rolling the mixture into a sheet having a definite width and a definite thickness, of drying the sheet, and of cutting the sheet into a definite length.

First, the treatment of bagasse in the bagasse treating system (A) is described below in detail. The bagasse coming from sugar plants in the shape of cubes is first stored.

In FIG. 1, bagasse is fed into a crushing machine 1, in which the bagasse is finely crushed, and the bagasse thus crushed is sent to an agitating means 3 by the belt conveyer 2 disposed under the bottom of the crushing machine 1.

The crushed bagasse thus introduced into the agitating means 3 is agitated sufficiently while being sterilized by the steam supplied from a boiler 30 and is sent to a fungus addition tank 5 by means of a belt conveyer 4, disposed under the bottom of the agitating means 3.

In the embodiment shown in FIG. 2, the fungus addition tank 5 consists of an upper section 5A and a lower section 5B. The crushed bagasse introduced into the upper section 5A is mixed with a diluted aqueous dispersion of calcium carbonate ($CaCO_3$) such as a crushed coral reef, which is sprayed onto the bagasse from above through a water storage tank 6, whereby the crushed bagasse is incorporated with calcium carbonate and further cooled to the optimum temperature and neutralized by the diluted aqueous dispersion. The bagasse thus treated is then introduced into the lower section 5B, in which a speed fungus liquid containing *Trichoderma viride* is added to the bagasse, and then sent to the top of a multi-stage type fermentation tank 18 by means of a conveyer 17 as shown in FIG. 2. The fermentation tank 18 illustrated in FIG. 2 is composed of four stages of fermentation sections and the material to be fermented thus sent to the top of the tank 18 is sufficiently fermented and decomposed through the four stages to provide a soft product. That is, the bagasse thus supplied to the top of the tank 18 is decomposed by fermentation through the first and second stages and then in the third stage, a dough yeast, *Saccharomyces cervisiae*, is added to the bagasse thus decomposed and the bagasse mixture is neutralized by liquid $CaCO_3$. Furthermore, a seed yeast is added to the neutralized bagasse mixture to increase a protein source.

As the cultivation source for the fungus, a waste molasses or malt of bran are mixed with bagasse. The culture medium is different from that for *Trichoderma veride* and by using the combination of the two cultivations, the composite nutrition source is added to the bagasse.

The bagasse thus enriched with the protein is then sent to a mixing tank 20 from the bottom of the tank 18 by means of a belt conveyer 19 disposed under the bottom of the fermentation tank 18, and in the mixing tank 20, vitamins and other nutrition sources having high nutritional values, such as *Chlorella ellipsoidea* and the comfrey may be added to the bagasse, and also for the betterment of taste, Nucleotide liquids of RNA components may be added by using the yeast cultivated in tank 13. For example, enzymes such as *Candida flaveri, C. guillier mondire, Clostridium acetobutylieum, Eremothe cium ashpyii*, or *Ashpya gossipii* are neutralized, purified and then added to the tank 20 as an additive for Vitamin $B_2$ to increase the nutritional value of the bagasse.

As shown in FIG. 2, the mixing tank 20 consists of upper and lower sections, in which the bagasse is mixed with the protein source, the green stalk, the starch source, and the vitamin source which are supplied from other courses.

Each section of the tank 18 is equipped with a nozzle pipe 66 as shown in FIG. 10 and through the nozzle compressed air is supplied from a compressor 16 as shown in FIG. 1 into the tank, whereby the fermentation of the bagasse is conducted under the optimum conditions to decompose the bagasse and cultivate the yeast and thereafter the bagasse is collected in the tank 20 as mentioned above.

The bagasse thus fermented is withdrawn from the tank 18 with a postponed time relation as shown in FIG. 5, for example from four tanks 18 successively every 1 hour in the example of this invention. The embodiment illustrated in FIG. 5 shows an example of the postponed time relation between the time of supplying a raw bagasse to each of four tanks 18a, 18b, 18c, and 18d and the time of withdrawing the bagasse fermented in the tank taking, for example, about 4 hours in the example. In the tank 18a disposed at the far right tank of the four tanks, the first supply of the raw bagasse started, e.g., at 8 (o'clock), the first withdrawal of the bagasse thus fermented in the tank started at 12, the second supply of a raw bagasse started at 12, the second withdrawal of the bagasse fermented in the tank started at 16, the third supply of a raw bagasse started at 16, the third withdrawal of the bagasse fermented started at 20, the fourth (final) supply of a raw bagasse started at 20, and the fourth withdrawal of the bagasse fermented in the tank started at 24. In the tank 18b among the four tanks, each of the same operations as above started 1 hour late. Furthermore, in the third tank 18c from the right end, each of the same operations as the tank 18b started an additional 1 hour late (2 hours late as compared with the operation time of the tank 18a), and in the tank 18d disposed at the left end, each of the same operations as the tank 18c started 1 hour late (3 hours late as compared with the operation time of the tank 18a).

Accordingly, in the case of supplying a raw bagasse to the tanks 18a, 18b, 18c, and 18d from the tank 5 through the conveyor 17, the successive operations of "supplying the raw bagasse to the tank 18a during the first 1 hour period, supplying the bagasse to the tank 18b during the next 1 hour period, supplying the bagasse to the tank 18c during the next 1 hour period, and supplying the bagasse to the tank 18d during the next one hour period" is repeated 4 times. Also, the supply of the fermented bagasse from the four tanks 18 to the mixing tank 20 is conducted every 1 hour from each of the tanks 18a, 18b, 18c, and 18d successively.

In addition, the aforesaid embodiment was explained in connection with the case where the fermentation of bagasse in the tank 18 requires about 4 hours and thus if the fermentation period of time in each of the tanks is about 6 hours, the supply of the raw bagasse (and the withdrawal of the fermented bagasse) are conducted every 1.5 hours. In other words, if H is the fermentation period of time of bagasse and N is the number of tanks, the length of the "postponed time" in the specification is defined to be H/N.

A part of the bagasse fermented in the tank 18 is then sent back to the fungus addition tank 5 from the second plate of the tank 18 as a source for yeast cultivation by means of a belt conveyer. Also, on the other hand, a molasses is sent through a water tank 6, a waste molasses tank 8, a boiler 30, a first storage tank 9 for perphosphoric acid, and the tank 10 for ammonia to a molasses storage tank as the neutralized molasses and then the molasses liquid in the molasses tank 11 is sent to the fermentation tank 13. A seed yeast liquid is sent from a seed yeast tank 12 to the fermentation tank 13, wherein the protein yeast is continuously cultivated while stirring by compressed air at the optimum temperature. The aeration is conducted by sending compressed air through the nozzle pipes 7 and 15 shown in FIG. 4 from the compresser 16 and by the aeration to provide the optimum conditions for the cultivation of yeast. The protein yeast thus cultivated in the fermentation tank 13 is collected in the mixing tank 20 through a conduit.

Also, the cultivation of a protein yeast, Candida utilis, is conducted in the tank 13 containing a perphosphoric acid solution, aqueous ammonia, an aqueous sodium hydroxide solution, and an ammonium sulfate solution to supply nitrogen suitable for the yeast and adjust the pH of the system to about 4.5 suitable for the cultivation. The protein yeast thus cultivated in the tank 13 is then introduced into the mixing tank 20.

Thus, in the tank 20, the cultivated yeast, Candida utilis is mixed with the fermented bagasse sent from the tank 18 together with other starch source and vitamin source.

In each tank, a suitable culture medium is formed by the yeast added, the pH thereof is adjusted properly, and the optimum temperature is maintained. One of the preferable conditions for yeast cultivation is provided to the system in each tank by aeration through an air supply nozzle 15 shown in FIG. 4. The aeration to each tank is conducted by sending compressed air from the compressor 16 to provide the preferable conditions for cultivation.

Thus, the bagasse sent into the fermentation tanks 18, 18, — is sufficiently fermented, decomposed in the tanks by the optimum aeration and then introduced into the mixing tank 20 in the system (C) by means of a belt conveyer 19 with the definite time interval as stated above in regard to in FIG. 5 (e.g., every 1 hour in the example) and at the same time a part of the bagasse in the tanks 18 is supplied back to the fungus addition tank 5 as the yeast source. Furthermore, the protein source cultivated in the tank 13 and other materials are collected in the tank 20 and then the mixture is sent to a chute 43. The chemical composition of the decomposed bagasse to be sent into the mixing tank from the fermentation tank 18 was as follows:

| Component | Proportion |
| --- | --- |
|  | % |
| Crude protein | 34.5 |
| Crude fat | 6.59 |
| Crude ash content | 5.21 |
| Water-soluble inorganic nitrogen compound | 28.7 |

Mentioned above, the bagasse is mixed with the yeasts, fermented, and decomposed to increase its nutritional value and digestability as well as protein content. Then, the decomposed bagasse thus treated is controlled to have a proper proportion of crude fibers necessary for ruminants such as ox, etc., and also mixed with a cereal powder as a starch source and vitamins in the below mentioning green stalk treating system (B). Also, in the case of producing feeds for pigs or hens, the crude fibers may be finely crushed.

Another embodiment of the fermentation and agitation tank is illustrated in FIG. 10 and FIG. 11 of the accompanying drawings. The apparatus is so constructed that the bagasse is mixed with a yeast liquid and fermented to be decomposed into a soft fibrous material and to absorb the nutrition source for yeast growth on the bagasse, whereby a main component for the composite feed for domestic animals, such as ox, horse, pig, hen, etc. is prepared.

That is, at the bottom of a storage agitation tank 63, equipped with a bagasse inlet 61 and an yeast liquid inlet 63, is formed an automatic outlet for bagasse. The storage agitation tank 63 is also equipped with a desired number of rotary shafts 65, 65, — in several stages and agitators 67, 67 — are equipped to each rotary shaft. Furthermore, a supply pipe 68, having spray nozzles 66, 66 — for spraying steam and liquid at a proper temperature in proper amounts, is provided at a slightly higher position on the storage tank 63. The numeral 69 is a small-scale automatic oil jack and the numerals 70, 70, — are chain belt pulleys for rotating simultaneously the rotary shafts 65, 65 —.

In the practice of the fermentation and decomposition of bagasse by this apparatus, the bagasse is continuously supplied to a storage tank 63 through an inlet 61 and rotary shafts, 65, 65, — are rotated to agitate the bagasse thus supplied by the agitators 67, 67, — fixed to the rotary shafts 65, 65, — and at the same time, an yeast liquid is supplied into the storage tank 63 from the yeast liquid inlet 62 equipped at the top of the storage tank 63 and also air is sprayed into the storage tank 63 through the spray nozzles 66 of the supply pipe 68.

By the procedure mentioned above, yeast can be cultivated under the optimum conditions, the acid contained in bagasse is neutralized and maintained at the optimum pH, and thus a fermentation is conducted to decompose bagasse fibers to provide the soft bagasse. In this case, the optimum temperature depends upon the kind of the yeast used and the control of the temperature of air in adjusting the fermentation temperature is conducted by adjusting the temperature of the air or liquid sprayed through spray nozzles 66, 66, —.

As mentioned above, the bagasse thus fermented and decomposed is a main component of the composite feed. The bagasse thus decomposed by fermentation is dropped successively onto the outlet 64, which can be opened and closed automatically and which is provided at to the bottom of the storage tank 63 and then sent to the subsequent tank by means of a belt conveyer, etc. The embodiment shown in FIG. 10 and FIG. 11 provides a proper means for controlling the decomposition action of the bagasse by yeast by adjusting the treating period of time and further by supplying a fresh liquid from the yeast liquid inlet 62.

Then, the green stalk, supplied to a crusher 22, which is the first step of the green stalk treating system (B), in which the green stalk is crushed, and then the crushed green stalk is introduced into an agitating means 24 by means of a belt conveyer 23, disposed under the bottom of a crushing machine 22. Shown in FIG. 3 the green stalk which is sufficiently agitated is sent to the top of a drying duct 52 by means of a backet conveyer 51, disposed under the bottom of the agitating means 24. After the green stalk is sufficiently dried in this screen conveyer multiple dry duct, it is carried by a belt conveyer 53 and introduced into the end of a hot blast type crushing means 26 by means of a screw conveyer 25. The cross sectional front view and side view of the hot blast type crushing means 26 are shown in FIG. 6 and FIG. 7, respectively. In the figures, a cylinder 55 of said crushing means 26 is rotatably supported by a supporting member 54 and two compressive plates 28 and 28 each having an arched concave 57 are disposed at the center of the bottom of the cylinder 55, while applying an elastic outwardly directing force to the lower portions of the compressive plate by means of a compressed spring 56, so that the compressive plates are in contact with each other at the back sides. At the outside of the arched concaves of the compressive plates 28 and 28 are disposed two crushing rollers 29 and 29 slidably from above to foot along the arched concaves 57 and 57 of the compressive plates 28 and 28.

When the green stalk is continuously supplied to the rear portion of a cylindrical body 55 through a screw conveyer 51, disposed behind the upper portion of the cylindrical body 55, the green stalk thus supplied is moved forward slowly in the cylinder 55 by means of a screw propeller 27, formed on the inside wall of the cylinder 55, during which the green stalk is slowly crushed by the sliding force generated between the crushing roller 29 and the arched concave 57 of the compressive plate 28. Furthermore, because the compressive plates 28 and 28 which are disposed at the center of the bottom of the cylinder 55 with back to back are provided with the outwardly directing elastic force at the bottom portions, the green stalk is smoothly crushed by the compressive force between the arched concave 57 of the compressive plate 28 and the crushing roller 29 and then the green stalk thus crushed is continuously withdrawn from the cylinder 55 by a screw conveyer 31, disposed at the front portion of the cylinder 55. Moreover, during the crushing operation, the green stalk may be dried by passing a hot blast through the cylinder and then the screw conveyer 31 is connected to a cold blast type crushing means 32. The structure of the interior of the cold blast type crushing means 32 is almost the same as that of the hot blast type crushing means 26. The green stalk is further crushed more finely in the cold blast type crushing means 32, sent to a storage and agitation tank 34 by means of a screw conveyer 33, and then sent to a measuring device 36 from the bottom of the storage and agitation tank 34 in a predetermined amount by means of a belt conveyer 35.

To the measuring device is sent little by little a crushed cereal from a hopper 37, a crushing machine 38, and a storage and agitation tank 39 and definite amounts of the crushed and dried green stalk and the crushed cereal measured in the measuring device 36 are sent to the mixing tank, which is the first step in the above-mentioned course (C), by means of a belt conveyer 41.

Accordingly, the bagasse fermented, the protein and other nutritious sources from the tank 13, and the mixture of the green stalk and the cereal thus crushed are supplied to the mixing tank 20 in proper ratios and sufficiently agitated in the mixing tank 20 to provide the non-dried mixture for a composite feed. The non-dried mixture was supplied to a shoot 43 by means of a belt conveyer 42, disposed under the bottom of the mixing tank 20, and then fabricated into the sheet having a definite width and a definite thickness by the rolling means 44 connected in parallel to the bottom of the chute 43.

The embodiment of the rolling means is illustrated in FIG. 12 and FIG. 13. Two compression rolls 74 and 74 are disposed in a lower portion of the hopper 73 having an inlet 60 at the top thereof and an outlet 72 at a lower and front portion thereof so that the rolls 74 and 74 can be rotated in opposite directions to each other for sending downward the materials supplied under compression. A vibration machine is disposed at 72 to insure a uniform thickness of the material thus sent downward. Under the bottom of the hopper 73 is disposed the back portion of a caterpillar type roll 75, having a definite length for sending materials from the hopper. Also, a caterpillar type conveyer 76 for rolling, having a definite length, is disposed above the front portion of the caterpillar type conveyer 75 in parallel with the conveyer 75 with an interval 77 slightly smaller than the vertical width (H) of the inlet portion 72 of the hopper 73.

In an example of the system shown in FIG. 12 and FIG. 13, the vertical width (H) of the inlet 72 of the hopper 73 is 7 mm. and the interval 77 between the caterpillar type roll 75 and the caterpillar type roll 76 is 5 mm. The thickness thereof can be adjusted. Thus, when the fermented mixture treated in the above means is introduced in the hopper 73, the fermented mixture is forcibly supplied onto the caterpillar type roll 75 disposed under the bottom of the hopper by means of the compression rolls 74 and 74 disposed in the lower portion of the hopper 73 and then transferred as a layer of the fermented mixture having a definite thickness determined by the width (H) of the outlet 72 of the hopper 73 on the roll 75. The layer of the fermented mixture thus transferred on the roll 75 is compressed in the space between the conveyer 75 and the caterpillar type conveyer 77 travelling in the direction of the arrow shown in the figure. The interval of both rolls is smaller than the vertical width of the outlet 72, that is, the thickness of the layer of the mixture. Then, the mixture is withdrawn from the end of the caterpillar type roll 75 as the belt-shaped product having a definite thickness. The fermented mixture, a belt shaped product with a definite thickness, is then transferred continuously from the end of a caterpillar type roll 75 into the screw conveyor 59 of a dry duct to go through a zigzag drying path, and after thus being dried, is cut into a desired length. The means for drying the belt shaped product is illustrated in FIG. 8 and FIG. 14. As shown in the figures, wire netting conveyors 59 and 59 detain between them the left-shaped product 84 supplied to the space between the caterpillar type roll 75 and the caterpillar type roll 76 for compression from the back end portion of the dry duct passageway 58. The drying means is composed of a zigzag drying passageway 58 having proper drying boilers 78, 78, — at three positions of the lower portion of the duct 58 and the belt-shaped product held by the wire netting members 59 and 59 is sent through the zigzag path 58 to an outlet 81. Above the outlet 81 of the zigzag path 58 are disposed cutting rollers 82 and 82, through which the wire netting members 59 and 59 of the upper and lower surfaces of the rolled product dried and sent from the outlet 81 of the zigzag drying path 58 are separated from the product by a take-up means 83 and the product is put into a desired rectangular form.

The rectangular product is then cut into a desired length by means of a cutting means 46 and packed. That is, in front of the rollers 82 and 82 is disposed the cutting means 46 for cutting the dried product into a desired length. Also, in front of the cutting means 46 is disposed a chute 47 for piling the dried product thus cut into the desired length and having an outlet 85 for the product in its front part. Thus, the products cut into a desired shape and packed are piled in the chute 47 and packed. Therefore, the mixed feed thus packed in the chute 47 has a definite shape and thickness and can be withdrawn from the bottom of the chute 47 and transferred into a storehouse by means of a truck 48, etc.

As mentioned above, according to the present invention, complete feeds suitable for cattle, horses, pigs, poultry, etc., can be continuously produced in a large scale and economically by using as main raw material, the decomposed bagasse prepared by fermentation using specific fungi to provide the decomposed bagasse containing a large proportion of protein and a reduced amount of crude fibers.

What is claimed is:

1. A process of making a composite feed for domestic animals containing bagasse, yeast, and protein, which comprises mixing raw bagasse from sugar plants with a yeast like microorganism selected from the group consisting of *Candida utilis* and *C. utilis var* major and also with *Trichoderma viride*, said yeast like microorganism proteinizing said bagasse and said *Trichoderma viride* decomposing the cellulose of the crude fibers of the bagasse to dextrose, fermenting the thus formed mixture for about 4–6 hours, thereby proteinizing said raw bagasse and decomposing the cellulose to dextrose, mixing the thus fermented mixture with a starch source, rolling the resultant mixture into a desired shape, and drying the mixture to provide a solid composite feed.

2. The process as claimed in claim 1 wherein said fermentation of the bagasse is conducted aerobially by mixing the mixture with air automatically under the optimum conditions for cultivating said yeast like microorganism and said *Trichoderma viride*.

3. The process as claimed in claim 1 wherein after said fermentation, powdered Chlorella and comfrey is added to the fermented mixture for increasing the vitamin content and the nutritional value.

4. The process as claimed in claim 1 wherein Nucleotide liquid is added to the fermented mixture as an additive for improving the taste of the product.

5. The process as claimed in claim 1 wherein purified cultivation liquid of *Candida flaveri*, *C. guillier mondire*, *Clostridium acetobutylieum*, *Eremothe cium ashpyii* or *Ashpya gossipii* is added to the fermented mixture as an additive for providing Vitamin $B_2$.

6. The process as claimed in claim 1 wherein *Saccharomyces cerevisiae* is added as an additional protein source before said fermentation.

7. The process as claimed in claim 1 wherein said fermentation is conducted by a multiple stage system.

8. The process as claimed in claim 1 wherein calcium carbonate powder is added to the mixture to be fermented.

9. Process according to claim 1 wherein said starch source is selected from the group consisting of the top portion of sugar cane and cereals.

10. In the method of producing feed for domestic animals, the conversion of raw bagasse from sugar plants to a digestible source of protein and dextrose, which comprises fermenting said bagasse for about 4–6 hours with a yeast like microorganism selected from the group consisting of *Candida utilis* and *C. utilis var major* and also with *Trichoderma viride*, said yeast like microorganism proteinizing said raw bagasse and said *Trichoderma viride* converting the cellulose of said bagasse to dextrose.

* * * * *